(12) United States Patent
Yang et al.

(10) Patent No.: US 8,962,075 B2
(45) Date of Patent: Feb. 24, 2015

(54) HOLLOW METAL SPHERE WITH MESOPOROUS STRUCTURE AND METHOD FOR MANUFACTURING THE SAME

(75) Inventors: Chia-Min Yang, Hsinchu (TW); Bo-Kai Chen, Hsinchu (TW); You-Wei Hu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 135 days.

(21) Appl. No.: 13/489,041

(22) Filed: Jun. 5, 2012

(65) Prior Publication Data

US 2012/0321897 A1 Dec. 20, 2012

(30) Foreign Application Priority Data

Jun. 17, 2011 (TW) .............................. 100121234 A
Dec. 7, 2011 (TW) .............................. 100145163 A

(51) Int. Cl.
*B32B 5/16* (2006.01)
*C01B 37/02* (2006.01)

(52) U.S. Cl.
USPC ........... 427/212; 427/215; 427/217; 428/402; 428/403; 423/335; 423/339; 977/773; 977/810

(58) Field of Classification Search
USPC ........... 428/402, 403; 423/335, 339; 427/212, 427/215, 217; 977/773, 810
See application file for complete search history.

(56) References Cited

U.S. PATENT DOCUMENTS

| 6,733,828 B2 | 5/2004 | Chao et al. | |
| 2010/0015026 A1* | 1/2010 | Yang et al. | 423/328.1 |
| 2010/0015027 A1* | 1/2010 | Yang et al. | 423/328.1 |

FOREIGN PATENT DOCUMENTS

| CN | 101973590 A | 2/2011 |
| CN | 102126729 * | 7/2011 |

OTHER PUBLICATIONS

Li-Lin Chang, "New Type of Mesoporous Silica Nanostructure: Synthesis, Structural and Morphological Control," Thesis, National Tsing Hua University Repository, pp. 1-157 with English Abstract (2009).

* cited by examiner

*Primary Examiner* — Leszek Kiliman
(74) *Attorney, Agent, or Firm* — Muncy, Geissler, Olds & Lowe, P.C.

(57) ABSTRACT

A method for manufacturing a hollow metal sphere with a mesoporous structure is disclosed, which comprises the following steps: (A) providing a hollow sphere template with a mesoporous structure, wherein the hollow sphere template comprises: a first shell with plural channels penetrating the first shell, the material of the first shell comprises a mesoporous silica material, and the mesoporous silica material has a cubic Ia3d symmetry pore structure; (B) mixing the hollow sphere template with a metal precursor; (C) reducing the metal precursor; and (D) removing the hollow sphere template to obtain a hollow metal sphere with a mesoporous structure. In addition, the present invention also provides a hollow metal sphere with a mesoporous structure prepared by the aforementioned method.

19 Claims, 5 Drawing Sheets

HOLLOW METAL SPHERE WITH MESOPOROUS STRUCTURE AND METHOD FOR MANUFACTURING THE SAME

CROSS REFERENCE TO RELATED APPLICATION

This application claims the benefits of the Taiwan Patent Application Serial Number 100145163, filed on Dec. 7, 2011, the subject matter of which is incorporated herein by reference.

BACKGROUND OF THE INVENTION

1. Field of the Invention

The present invention relates to a hollow metal sphere with a mesoporous structure and a method for manufacturing the same and, more particularly, to a hollow metal sphere and a method for manufacturing the same, wherein the mesopores of the material for forming a shell of the hollow metal sphere are arranged in Ia3d cubic symmetry.

2. Description of Related Art

Metal nanostructure can be applied to photoelectric technologies related to energy fields, catalytic technologies related to green chemistry and nano-biomedical detections. For example, metal nanostructures can be used as Pt-based electrode catalysts for fuel cells, nano Au catalysts for several catalytic oxidation reactions or other reactions, and Pd catalysts for various organic catalytic reactions.

As people pay more and more attention to environmental protection, hydrogen fuel cells which can reduce environmental pollutions and decrease the emission of carbon oxide, are gradually commercialized. The fuel cells can be applied to various fields, such as large generators, and power supplements for rockets and vehicles. In addition, as the sizes of hydrogen fuel cells are developed into micro-size, the fuel cells may further be applied to portable electronic devices, such as mobile phones, notebooks and digital cameras.

As well known to those skilled in the art, the structures of metal nano-catalysts are unstable and may aggregate to form large particles. Hence, metal nano-catalysts have to be co-used with carriers having large surface areas to perform catalytic reactions. However, when metal nano-catalysts are co-used with carriers, the carriers may participate in the catalytic reaction or indirectly influence the chemical properties of the metal catalysts. Hence, several studies have focused on the development of metal nano-catalysts having stable structures, in order to obtain metal nano-catalysts which can be used alone without co-using carriers in catalytic reactions.

Therefore, it is desirable to provide a hollow metal sphere with a mesoporous structure which can be used as a catalyst, and a method for manufacturing the same, in order to prepare a hollow metal sphere with a mesoporous structure in a simple way. In this case, the reaction surface of the hollow metal sphere can be increased, so the catalytic efficiency of the metal nano-catalysts can further be improved.

SUMMARY OF THE INVENTION

The object of the present invention is to provide a method for manufacturing a hollow metal sphere with a mesoporous structure, in order to prepare a hollow metal sphere with nanosize and uniform particle size, through a simple process. In addition, the thickness of the shell and the diameter of the pores can be adjusted by using the method of the present invention.

Another object of the present invention is to provide a hollow metal sphere with a mesoporous structure, wherein there are plural mesopores penetrating through both surfaces of the shell of the hollow sphere. Hence, the catalytic efficiency of the hollow metal sphere can further be improved.

To achieve the objects, the method for manufacturing the hollow metal sphere with the mesoporous structure of the present invention comprises the following steps: (A) providing a hollow sphere template with a mesoporous structure, wherein the hollow sphere template comprises: a first shell with plural channels penetrating the first shell, the material of the first shell comprises a mesoporous silica material, and the mesoporous silica material has a cubic symmetry pore structure; (B) mixing the hollow sphere template with a metal precursor; (C) reducing the metal precursor; and (D) removing the hollow sphere template to obtain a hollow metal sphere with a mesoporous structure.

In the step (B) of the method of the present invention, the metal precursor can flow into the mesopores through a capillarity attraction, and then the hollow structure of the hollow sphere template is filled with the metal precursor. When the mixed ratio of the metal precursor and the hollow sphere template is properly controlled, the hollow structure of the hollow sphere template can be completely filled with the metal precursor. In addition, a molten metal precursor can be directly used in the step (B). Furthermore, the metal precursor can also be dissolved in a solvent such as acetone and ethanol to form a metal precursor solution, if it is necessary.

After the aforementioned process, the hollow metal sphere with the mesoporous structure of the present invention is obtained, which comprises: a second shell with plural channels penetrating the second shell, the material of the second shell comprises a mesoporous metal material, and the mesoporous metal material has a cubic symmetry pore structure.

A $SiO_2$ template is usually used in the conventional process. Although the $SiO_2$ template may have a mesoporous structure, it is a bulk material without hollow structure. Hence, when the conventional template is used to prepare a metal material with a mesoporous structure, there is usually a problem of how to selectively fill the mesopores with the metal precursor. In addition, the density of the metal precursor is usually smaller than that of the reduced metal. Hence, only half or lower volume of mesopores of the hollow sphere template can be filled with the reduced metal, even though the mesopores are completely filled with the metal precursor. Furthermore, the mesoporous structure of the template cannot be completely copied to obtain a copied metal nanostructure, even though the mesopores of the template are repeatedly refilled with the metal precursor and the reducing reaction is repeatedly performed. However, according to the method for manufacturing the hollow metal sphere with the mesoporous structure of the present invention, both the mesopores of the shell and the hollow structure of the hollow sphere template are filled with the metal precursor. Hence, the metal precursor can be reduced in the mesopores of the shell of the hollow sphere template. In addition, the metal precursor contained in the hollow structure of the hollow sphere template can continuously fill into the mesopores of the shell of the hollow sphere template, so the occupied volume of the reduced metal in the mesopores of the shell of the hollow sphere template can further be increased. Hence, the mesoporous structure of the hollow sphere template can be completely copied to obtain a hollow metal sphere with a structure corresponding to the structure of the hollow sphere template through the method of the present invention.

In addition, the particle size of the obtained hollow metal sphere of the present invention is in nanoscale such as 2.5-5 nm, so there is a larger reaction surface existing in the nanostructure of the shell of the hollow metal sphere. Hence, when the hollow metal sphere of the present invention is used as a catalyst, the catalytic efficiency can further be improved. In addition, the material of the metal catalyst is usually precious metals, which are very expensive. According to the hollow metal sphere of the present invention, both the thickness of the shell and the diameter of the pores can be adjusted. Hence, a maximum reaction surface of the hollow metal sphere can be obtained and the catalytic efficiency thereof can further be optimized by using a minimum amount of precious metal precursor.

According to the method for manufacturing the hollow metal sphere with the mesoporous structure of the present invention, the hollow sphere template provided in the step (A) is manufactured through the following steps: (A1) providing an alkaline solution of mixed surfactants, wherein the mixed surfactants comprise a cationic surfactant and a non-ionic surfactant, the cationic surfactant is represented by the following formula (I), and the non-ionic surfactant is represented by the following formula (II):

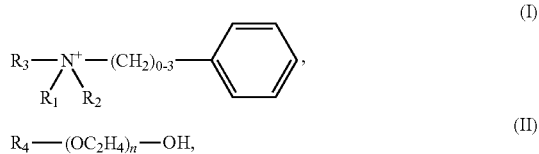

wherein, each $R_1$ and $R_2$ independently is a $C_1$-$C_3$ alkyl group, $R_3$ is a $C_{12}$-$C_{22}$ alkyl group, $R_4$ is a $C_{12}$-$C_{22}$ alkyl group, and n is an integer ranging from 2 to 20; and (A2) adding a silane precursor into the alkaline solution of the mixed surfactants to make the silane precursor form into the hollow sphere template with a mesoporous structure, wherein the silane precursor is represented by the following formula (III):

wherein each $R_5$ is independently a $C_1$-$C_3$ alkyl group.

When the aforementioned process is performed, a hollow sphere template with a specific structure can be obtained. Herein, the silane precursor can self-assemble into a hollow sphere template through a simple process by using mixed surfactants of a cationic surfactant and a non-ionic surfactant. When the relative amount of each component in the reaction solution and other reaction condition is modified, the outer diameter (i.e. particle size), the inner diameter and the thickness of the shell of the hollow sphere template can be adjusted. In addition, when a hollow sphere template with a mesoporous structure is prepared by use of the aforementioned method of the present invention, the mesopores of the silica material bi-continuously penetrate the shell of the hollow sphere template and are arranged in Ia3d cubic symmetry.

Furthermore, according to the method for manufacturing the hollow metal sphere with the mesoporous structure of the present invention, the hollow sphere template preferably has a hydrophobic surface.

Preferably, according to the hollow metal sphere with the mesoporous structure and the method for manufacturing the same of the present invention, the mesopores of the mesoporous silica material of the hollow sphere template and those of the mesoporous metal material of the hollow metal sphere are arranged in a cubic Ia3d symmetry pore structure.

According to the step (A2) of the method of the present invention, the amount of the silane precursor is 0.7-1 parts by mole. In addition, the reaction temperature of the silane precursor is 25-50° C.

According to the cationic surfactant represented by the formula (I) of the present invention, preferably, each $R_1$ and $R_2$ independently is a methyl group, an ethyl group, or a propyl group, and $R_3$ is a $C_{14}$-$C_{20}$ alkyl group. More preferably, each $R_1$ and $R_2$ independently is a methyl group or an ethyl group, and $R_3$ is a $C_{14}$-$C_{20}$ alkyl group. Most preferably, the cationic surfactant is N-hexadecyl-N,N-dimethylbenzenaminium halide represented by the following formula (IV), N-benzyl-N,N-dimethylhexadecan-1-aminium halide represented by the following formula (V), or N,N-dimethyl-N-phenethylhexadecan-1-aminium halide represented by the following formula (VI):

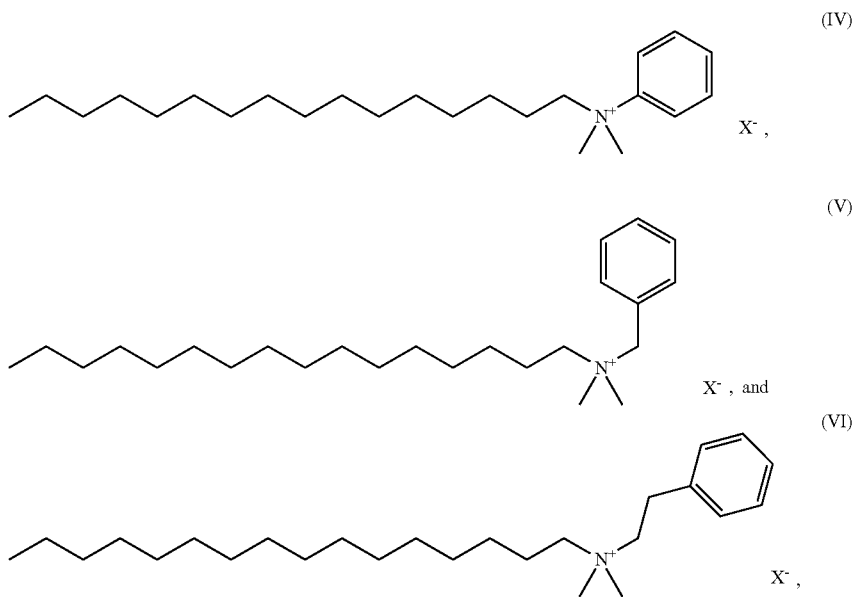

wherein $X^-$ is $Cl^-$ or $Br^-$.

Furthermore, according to the non-ionic surfactant represented by the formula (II) of the present invention, preferably, $R_4$ is a $C_{14}$-$C_{20}$ alkyl group, and n is an integer ranging from 2 to 10. More preferably, $R_4$ is a $C_{14}$-$C_{18}$ alkyl group, and n is an integer ranging from 2 to 5. Most preferably, $R_4$ is a hexadecyl ($C_{16}$ alkyl) group, and n is an integer ranging from 2 to 3.

According to the silane precursor represented by the formula (III) of the present invention, each $R_5$ independently can be a $C_1$-$C_3$ alkyl group. Preferably, each $R_5$ is the same functional group such as a methyl group, an ethyl group, or a propyl group. More preferably, each $R_5$ is an ethyl group. The specific examples of the precursors for silica can be tetramethoxysilane (TMOS), tetraethoxysilane (TEOS), or tetrapropoxysilane (TPOS).

In addition, according to the step (A1) of the method of the present invention, the mixed surfactants in the alkaline solution may comprise: 0.065-0.095 parts by mole of the cationic surfactant, and 0.005-0.035 parts by mole of the non-ionic surfactant. The amount of water contained in the alkaline solution of the mixed surfactants may be 300-2000 parts by mole. When the amount of water or the relative amount of each component in the reaction solution is adjusted, the outer diameter (i.e. particle size), the inner diameter and the thickness of the shell of the hollow sphere template can be adjusted.

Furthermore, according to the step (A1) of the method of the present invention, the alkaline solution of the mixed surfactants may further comprise: an inorganic base. Herein, the inorganic base can be LiOH, NaOH, KOH, RbOH, or $NH_4OH$. Preferably, the inorganic base is LiOH, NaOH, KOH, or $NH_4OH$. More preferably, the inorganic base is NaOH or $NH_4OH$. The amount of the inorganic base in the alkaline solution of the mixed surfactants preferably is 0.1-0.5 parts by mole. More preferably, the amount of the inorganic base in the alkaline solution of the mixed surfactants is 0.25-0.4 parts by mole.

The method for manufacturing a hollow metal sphere with a mesoporous structure of the present invention only discloses one example for preparing a $SiO_2$ hollow sphere template. The structure, components and manufacturing method of the $SiO_2$ hollow sphere disclosed in Taiwan Patent Application No. 100110568 and U.S. patent application Ser. No. 13/204,143 are incorporated into the present invention for reference.

According to the hollow metal sphere with the mesoporous structure and the method for manufacturing the same of the present invention, the material of the hollow metal sphere may be Pt, Au, Ag, Pd, Fe, Co, Ni, or an alloy thereof. Preferably, the material of the hollow metal sphere is Pt. In addition, the metal precursor may be a metal chloride or a metal nitride of Pt, Au, Ag, Pd, Fe, Co, or Ni, such as $H_2PtCl_6$, $Ni(NO_3)_2$ or other metal salts. Preferably, the metal precursor is $H_2PtCl_6$.

In addition, according to the method for manufacturing the hollow metal sphere with the mesoporous structure of the present invention, any reducing process known in the art can be selectively used in the step (C) to reduce the metal precursor based on the types of the metal precursor. Preferably, a hydrogen gas is introduced to reduce the metal precursor in the step (C).

In addition, according to the method for manufacturing the hollow metal sphere with the mesoporous structure of the present invention, any method for dissolving $SiO_2$ known in the art can be selectively used in the step (D) to remove the hollow sphere template. Preferably, the hollow sphere template is removed with an HF solution in the step (D).

According to the hollow metal sphere with the mesoporous structure and the method for manufacturing the same of the present invention, the hollow sphere template preferably has a particle size of 50-300 nm, and the thickness of the shell thereof preferably is 5-50 nm. The hollow metal sphere of the present invention has a copied structure and shape of the hollow sphere template, so the particle size and the thickness of the shell of the hollow metal sphere are basically the same as those of the hollow sphere template. Preferably, the particle size of the hollow metal sphere is 50-300 nm, and the thickness of the shell thereof is 5-50 nm.

Other objects, advantages, and novel features of the invention will become more apparent from the following detailed description when taken in conjunction with the accompanying drawings.

DETAILED DESCRIPTION OF THE PREFERRED EMBODIMENT

Embodiment

Preparation of $SiO_2$ Hollow Sphere Template 0.7 parts by mole of cationic surfactant and 1200 parts by mole of deionized water were added into a reaction flask, and stirred to dissolve at 35° C. In the present embodiment, the cationic surfactant was N-benzyl-N,N-dimethylhexadecan-1-aminium chloride.

Next, 0.3 parts by mole of non-ionic surfactant was added into the reaction solution, and stirred to dissolve at 35° C. In the present embodiment, the non-ionic surfactant was $C_{16}H_{33}(OC_2H_4)_2OH$.

0.32 parts by mole of inorganic base was added into the reaction solution containing the cationic surfactant and the non-ionic surfactant, and stirred to dissolve at 35° C. In the present embodiment, the inorganic base was NaOH. After the aforementioned steps, an alkaline solution of mixed surfactants was obtained.

Then, 1 part by mole of a silane precursor was added into the alkaline solution of the mixed surfactants. The reaction solution was stirred at 35° C. for 2-8 hrs, and aged at 70-90° C. for 1-3 days. In the present embodiment, the silane precursor is Tetraethoxysilane (TEOS).

Figure 1:
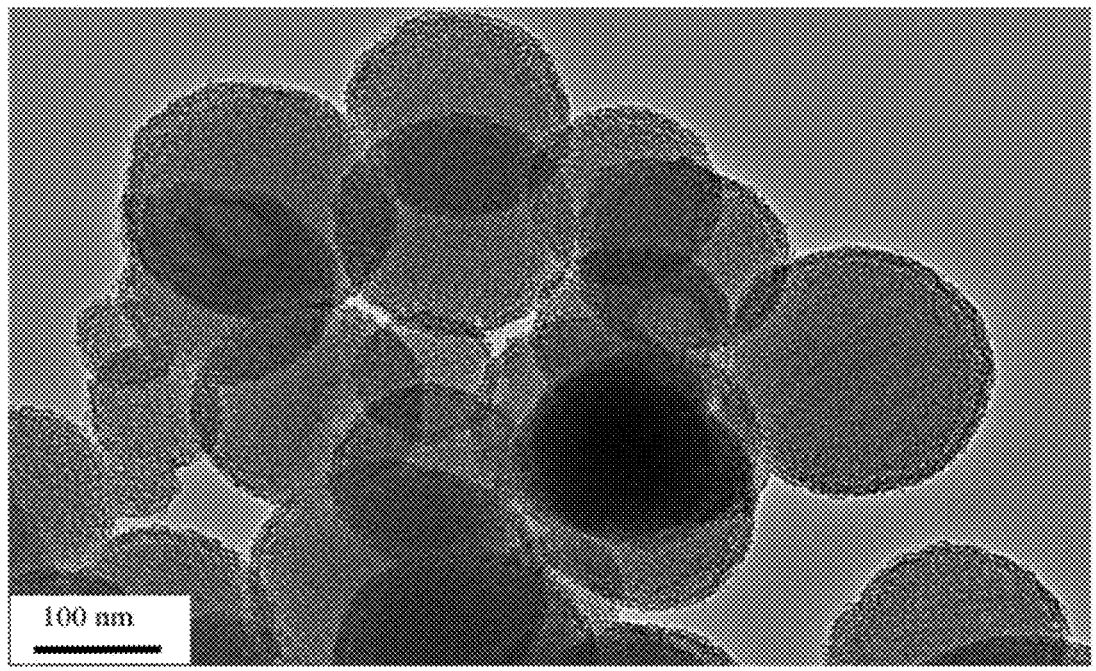
FIG. 1 is a TEM photo of a hollow sphere template used in the Embodiment of the present invention.
Figure 2:
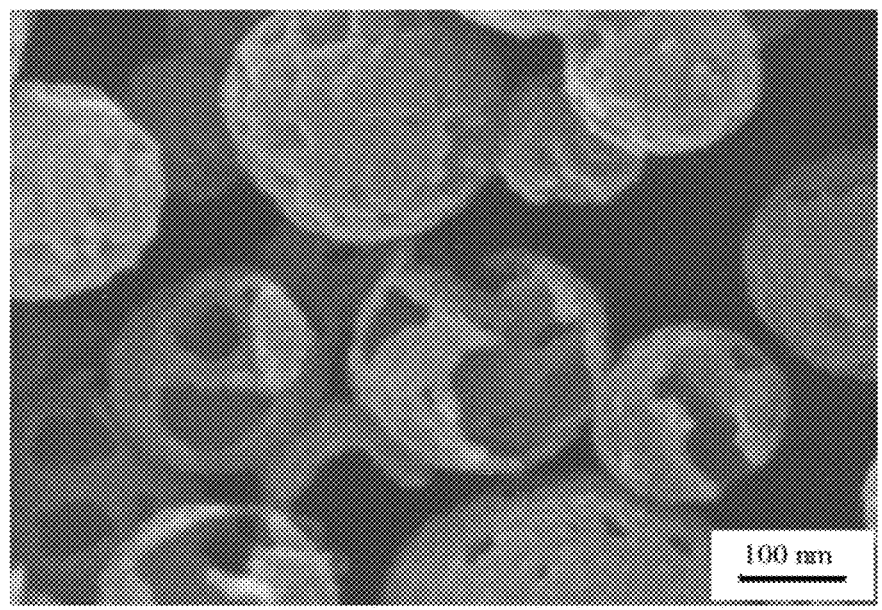
FIG. 2 is a SEM photo of a crushed hollow sphere template used in the Embodiment of the present invention.

Finally, the reaction solution was filtered and dried, and the dried precipitant was the hollow sphere template of the present embodiment. The hollow sphere template without crushing was analyzed with a transmission electron microscopy (TEM), and the crushed hollow sphere template was analyzed with a scanning electron microscope (SEM). As shown in FIGS. 1 and 2, the hollow sphere template of the present embodiment indeed has a hollow structure, and the particle size thereof is about 150 nm.

Figure 3:
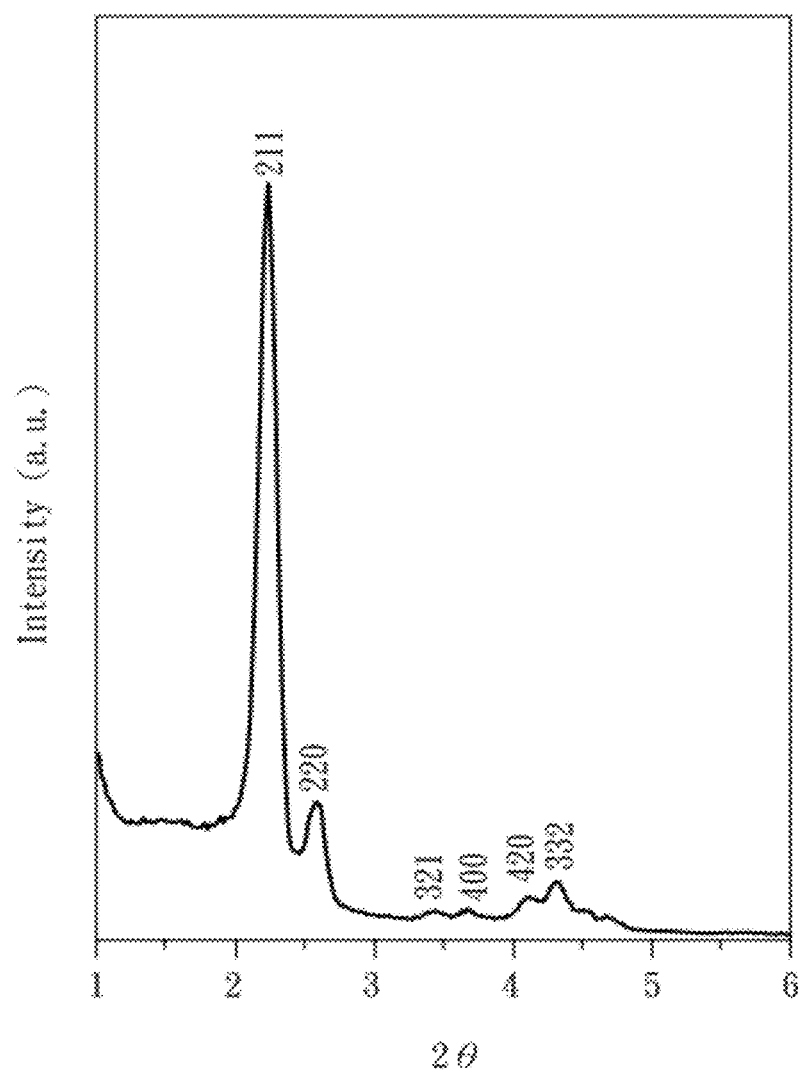
FIG. 3 is an X-ray diffraction diagram of a hollow sphere template used in the Embodiment of the present invention.

In addition, when the hollow sphere template of the present embodiment was analyzed with X-ray diffraction (XRD), the XRD diagram shows that the mesopores of the $SiO_2$ material for forming the shell of the hollow sphere template are arranged in Ia3d cubic symmetry, as shown in FIG. 3.

Preparation of Pt Hollow Metal Sphere

The obtained $SiO_2$ hollow sphere template (1 g) was added into a solution containing 50 ml of toluene and 1 ml of hexamethyldisilazane, and the resulting solution was stirred for 0.5-1 hr. Then, the resulting solution was filtered and dried to obtain a hollow sphere template with a hydrophobic surface.

The obtained $SiO_2$ hollow sphere template with the hydrophobic surface was mixed with a Pt precursor, wherein the ratio between the hollow sphere template and $H_2PtCl_6$ is 0.1 g:0.5834 g. In the present embodiment, the Pt precursor is a solid $H_2PtCl_6 \cdot 6H_2O$ (100%). The solid $H_2PtCl_6$ was heated into a molten state under 70° C. Then, the molten Pt precursor flowed into the mesopores of the shell of the hollow sphere template through a capillarity attraction, and the hollow structure of the hollow sphere template was completely filled with the molten Pt precursor.

Next, a hydrogen gas was introduced to reduce the Pt precursor. In the present embodiment, the reaction solution was heated to 200° C. at a rate of 0.75° C./min, kept at 200° C. for 3 hrs, and cooled to complete the reducing reaction under a hydrogen atmosphere.

Figure 4:
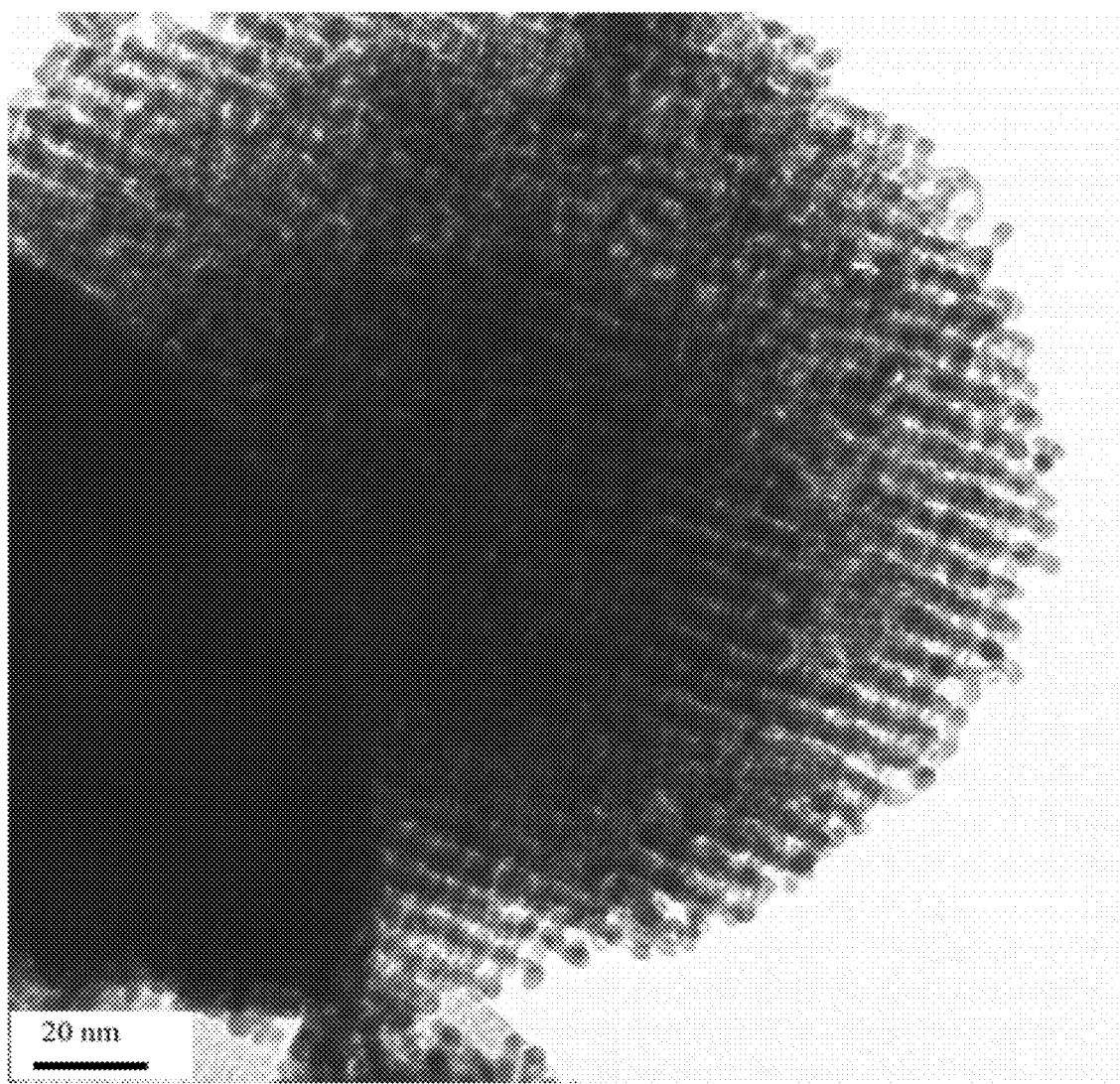
FIG. 4 is a TEM photo of a hollow metal sphere according to the Embodiment of the present invention.
Figure 5:
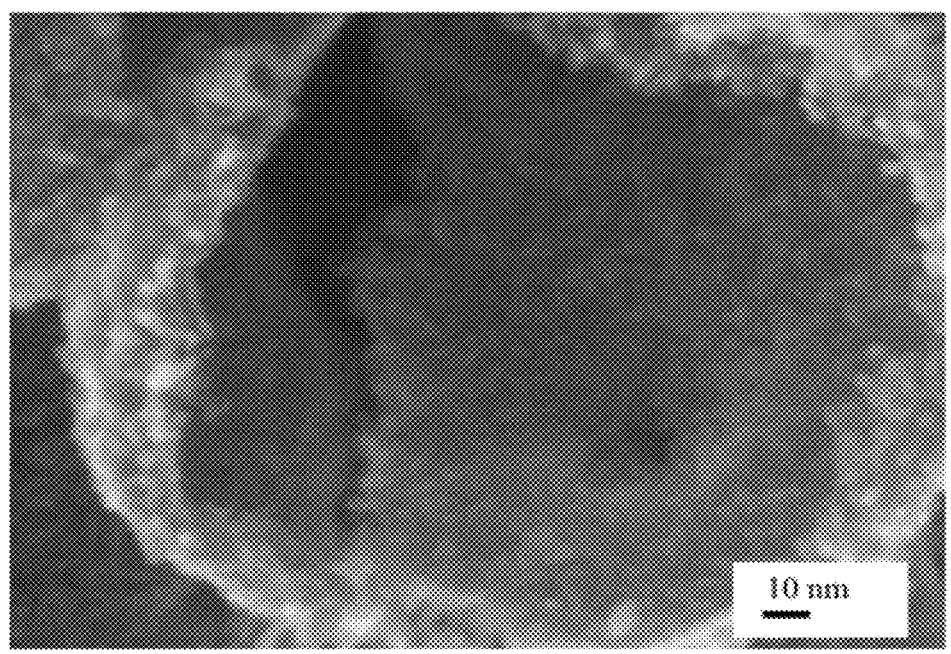
FIG. 5 is a SEM photo of a crushed hollow metal sphere according to the Embodiment of the present invention.
Figure 6:
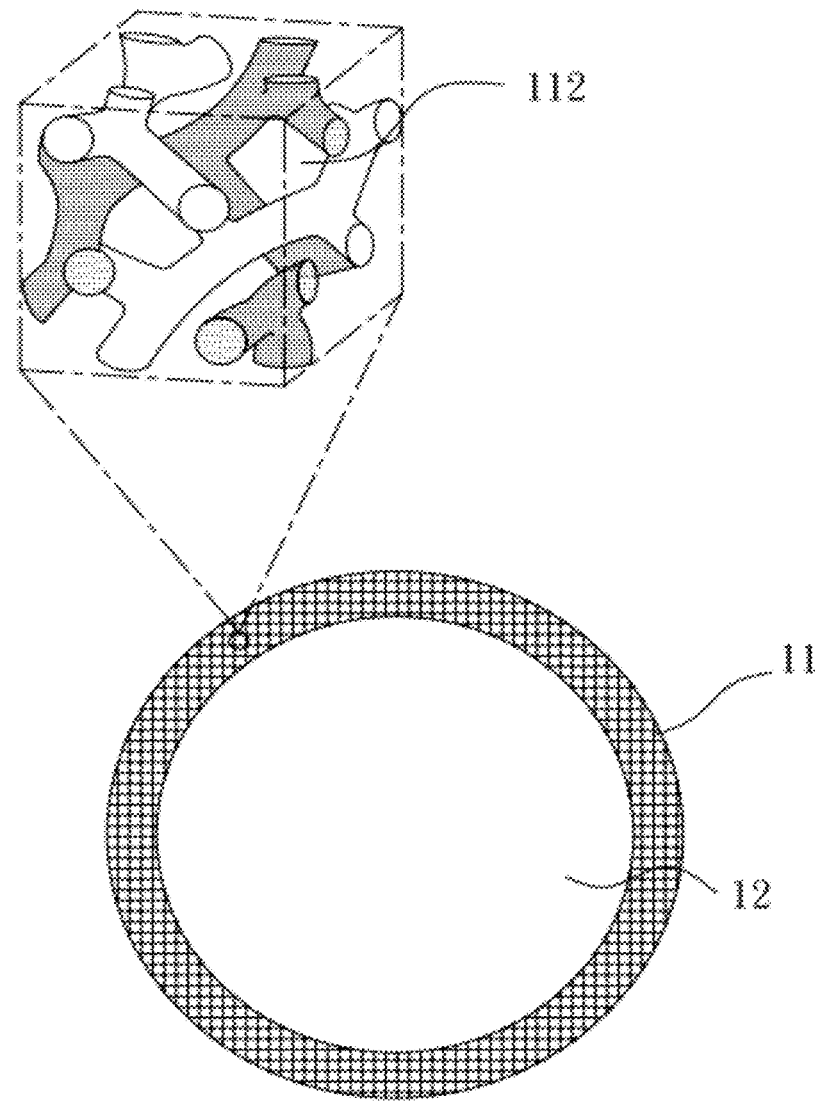
FIG. 6 is a perspective view showing the structure of hollow metal sphere according to the Embodiment of the present invention.

Finally, the reaction solution was mixed with HF solution (8 wt %) to dissolve the $SiO_2$ hollow sphere template. After a drying process, a Pt hollow metal sphere was obtained. The crushed Pt hollow metal sphere was analyzed with a scanning electron microscope (SEM), and the Pt hollow metal sphere without crushing was analyzed with a transmission electron microscopy (TEM). The results of TEM and SEM are shown in FIGS. 4 and 5. The perspective view of FIG. 6 shows that the hollow metal sphere of the present embodiment comprises a hollow structure 12, and the shell 11 of the hollow metal sphere has well-arranged mesopores 112. In addition, the particle size of the hollow metal sphere of the present embodiment is about 150 nm.

Although the present invention has been explained in relation to its preferred embodiment, it is to be understood that many other possible modifications and variations can be made without departing from the spirit and scope of the invention as hereinafter claimed.

What is claimed is:

1. A method for manufacturing a hollow metal sphere with a mesoporous structure, comprising the following steps:
   (A) providing a hollow sphere template with a mesoporous structure, wherein the hollow sphere template comprises: a first shell with plural channels penetrating the first shell, the material of the first shell comprises a mesoporous silica material, and the mesoporous silica material has a cubic symmetry pore structure;
   (B) mixing the hollow sphere template with a metal precursor;
   (C) reducing the metal precursor; and
   (D) removing the hollow sphere template to obtain a hollow metal sphere with a mesoporous structure.

2. The method as claimed in claim 1, wherein the mesoporous silica material has a cubic Ia3d symmetry pore structure.

3. The method as claimed in claim 1, wherein the hollow metal sphere with the mesoporous structure comprises: a second shell with plural channels penetrating the second shell, the material of the second shell comprises a mesoporous metal material, and the mesoporous metal material has a cubic symmetry pore structure.

4. The method as claimed in claim 3, wherein the mesoporous metal material has a cubic Ia3d symmetry pore structure.

5. The method as claimed in claim 3, wherein the hollow sphere template has a hydrophobic surface.

6. The method as claimed in claim 1, wherein the hollow sphere template provided in the step (A) is manufactured through the following steps:
   (A1) providing an alkaline solution of mixed surfactants, wherein the mixed surfactants comprises a cationic surfactant and a non-ionic surfactant, the cationic surfactant is represented by the following formula (I), and the non-ionic surfactant is represented by the following formula (II):

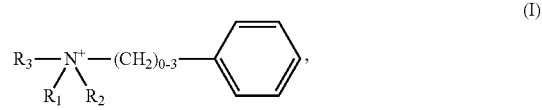

(I)

(II)

wherein, each $R_1$ and $R_2$ independently is a $C_1$-$C_3$ alkyl group, $R_3$ is a $C_{12}$-$C_{22}$ alkyl group, $R_4$ is a $C_{12}$-$C_{22}$ alkyl group, and n is an integer ranging from 2 to 20; and (A2) adding a silane precursor into the alkaline solution of the mixed surfactants to make the silane precursor form into the hollow sphere template with a mesoporous structure, wherein the silane precursor is represented by the following formula (III):

(III)

wherein each $R_5$ is independently a $C_1$-$C_3$ alkyl group.

7. The method as claimed in claim 6, wherein the alkaline solution of the mixed surfactants comprises: an inorganic base.

8. The method as claimed in claim 7, wherein the inorganic base is selected from the group consisting of LiOH, NaOH, KOH, RbOH, and $NH_4OH$.

9. The method as claimed in claim 6, wherein each $R_1$ and $R_2$ independently is a methyl group or an ethyl group, and $R_3$ is $C_{14}$-$C_{20}$ alkyl group.

10. The method as claimed in claim 9, wherein the cationic surfactant is selected from the group consisting of compounds represented by the following formulas (IV), (V), and (VI):

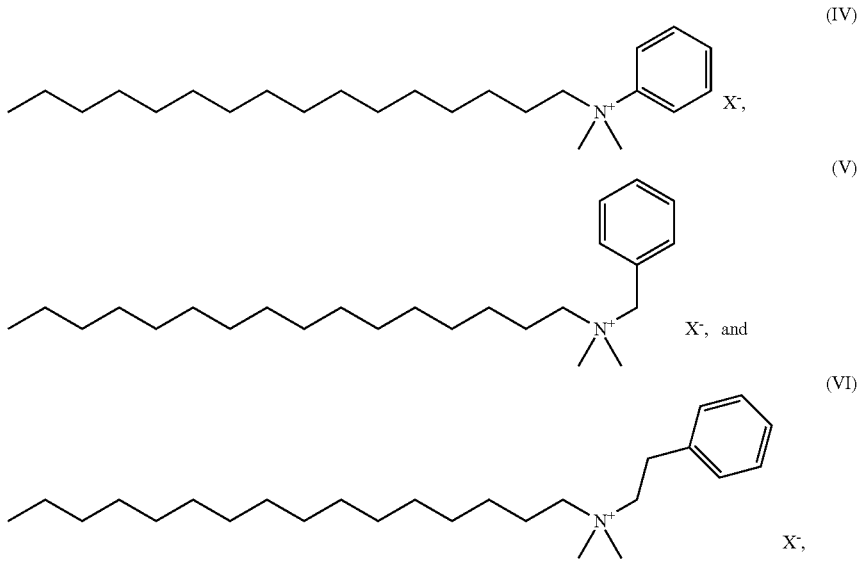

wherein, X⁻ is Cl⁻, or Br⁻.

11. The method as claimed in claim 6, wherein $R_4$ is a $C_{14}$-$C_{20}$ alkyl group, and n is an integer ranging from 2 to 10.

12. The method as claimed in claim 11, wherein $R_4$ is a hexadecyl group, and n is an integer ranging from 2 to 5.

13. The method as claimed in claim 6, wherein each $R_5$ is independently a methyl group, an ethyl group, or a propyl group.

14. The method as claimed in claim 1, wherein the material of the hollow metal sphere is Pt, Au, Ag, Pd, Fe, Co, Ni, or an alloy thereof.

15. The method as claimed in claim 1, wherein the metal precursor is a metal salt of Pt, Au, Ag, Pd, Fe, Co, or Ni.

16. The method as claimed in claim 1, wherein a hydrogen gas is introduced to reduce the metal precursor in the step (C).

17. The method as claimed in claim 1, wherein the hollow sphere template is removed with an HF solution in the step (D).

18. The method as claimed in claim 1, wherein a particle size of the hollow sphere template is 50-300 nm.

19. The method as claimed in claim 1, wherein a particle size of the metal hollow sphere is 50-300 nm.

* * * * *